US012046805B2

(12) United States Patent
Eshaq et al.

(10) Patent No.: US 12,046,805 B2
(45) Date of Patent: Jul. 23, 2024

(54) SELF CONTAINED AND SELF SEALING GALVANIC GROUNDING ANTENNA MOUNT

(71) Applicant: GM GLOBAL TECHNOLOGY OPERATIONS LLC, Detroit, MI (US)

(72) Inventors: Nahel Eshaq, Rochester, MI (US); Duane S Carper, Davison, MI (US); Gregg R Kittinger, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 17/648,739

(22) Filed: Jan. 24, 2022

(65) Prior Publication Data

US 2023/0238689 A1 Jul. 27, 2023

(51) Int. Cl.
*H01Q 1/32* (2006.01)
*H01Q 1/42* (2006.01)
*H01Q 1/48* (2006.01)

(52) U.S. Cl.
CPC ............... *H01Q 1/325* (2013.01); *H01Q 1/42* (2013.01); *H01Q 1/48* (2013.01)

(58) Field of Classification Search
CPC ........ H01Q 1/1214; H01Q 1/32; H01Q 1/325; H01Q 1/3275
See application file for complete search history.

(56) References Cited

U.S. PATENT DOCUMENTS

2005/0093755 A1* 5/2005 Byrne ........................ H01Q 1/27
343/713
2023/0261366 A1* 8/2023 Takayama ............ H01Q 1/2291
343/713

FOREIGN PATENT DOCUMENTS

CN 108390142 A * 8/2018 .............. F16B 39/26

* cited by examiner

*Primary Examiner* — Daniel Munoz
(74) *Attorney, Agent, or Firm* — Lorenz & Kopf, LLP

(57) ABSTRACT

A mount system, such as for a vehicle antenna, includes a module with a ground. A fastener extends into the module. A retainer clip moves from an undeployed position to a deployed position by operation of the fastener. The fastener extends through a deployment ramp block. The deployment ramp block engages and guides the retainer clip from the undeployed position to the deployed position, by operation of the fastener. The mount system is configured to effect grounding of the ground to the product and to retain the module in position on the product.

20 Claims, 4 Drawing Sheets

SELF CONTAINED AND SELF SEALING GALVANIC GROUNDING ANTENNA MOUNT

INTRODUCTION

The present disclosure generally relates to antenna mounting systems, and more specifically to self-contained and self-sealing mounting systems that provide galvanic grounding including for non-conductive antenna housings.

In the production of certain products, a number of antennas may be used for communication purposes including transmitting and receiving. In products such as vehicles, antennas may be used for a number of purposes. Antennas may be used with radios, positioning systems, cellular communication, vehicle-to-vehicle communication, radar and other sensing systems, driver assistance systems and others. Because the antennas are desirably mounted in positions without obstructions to remote transmitters and/or receivers, antennas are usually mounted on the top or perimeter surfaces of the vehicle. Example antenna placements include on the roof, the windows, the trunk, the bumpers, and other exterior surfaces. When a vehicle includes accessory structures such as spoilers, mirrors, shark fins or racks, mounting antennas on or in the structures becomes an option, particularly when the structures are made of plastic materials.

It is desirable to mount the antenna efficiently, with a minimum amount of time and effort. This may become more challenging when antennas are located in plastic structures and galvanic or coupled grounding is required, where the antennas require a low resistance ground to function.

Accordingly, it is further desirable to provide antenna mounts and systems that are easily assembled to a product and that meet grounding and other performance requirements. Furthermore, other desirable features and characteristics of the present invention will become apparent from the subsequent detailed description and the appended claims, taken in conjunction with the accompanying drawings and the foregoing technical field and background.

SUMMARY

In various embodiments, a mount system such as for a vehicle antenna, includes a module with a ground. A fastener extends into the module. A retainer clip moves from an undeployed position to a deployed position by operation of the fastener. The fastener extends through a deployment ramp block. The deployment ramp block engages and guides the retainer clip from the undeployed position to the deployed position, by operation of the fastener. The mount system is configured to effect grounding of the ground to the product and to retain the module in position on the product.

In additional embodiments, the module includes at least one antenna, and the ground comprises of a ground plane coupled with the at least one antenna.

In additional embodiments, the retainer clip includes a crown through which the fastener extends and includes a leg extending from the crown to the deployment ramp block.

In additional embodiments, the deployment ramp block includes a ramp that is annular in shape. The leg of the retainer clip is configured to deflect radially outward by riding over the ramp.

In additional embodiments, the module includes a housing base. A seal is configured to be compressed between the housing base and the product through operation of the fastener.

In additional embodiments, the module includes an antenna farm with plural antennas coupled with the ground.

In additional embodiments, the module is contained in a structure.

In additional embodiments, a crush tube extends into the module. The fastener extends through the crush tube and is configured to cause the crush tube to deform.

In additional embodiments, the structure comprises a vehicle accessory.

In additional embodiments, a circuit board is included in the module. The ground is formed as a ground plane on the circuit board.

In a number of additional embodiments, an antenna mount system for a product includes an antenna module with a ground plane. A fastener extends into the antenna module and through the ground plane. A retainer clip is configured to move from an undeployed state to a deployed state by operation of the fastener. The fastener extends through a deployment ramp block. The deployment ramp block is configured to engage and guide the retainer clip from the undeployed state to the deployed state. The antenna mount system is configured to ground the ground plane to the product and to retain the antenna module in position on the product.

In additional embodiments, the retainer clip includes a crown that is annular in shape and through which the fastener extends. The retainer clip includes a leg extending from the crown to the deployment ramp block, wherein the leg is annular in shape.

In additional embodiments, the deployment ramp block includes a ramp that is annular in shape. The leg of the retainer clip is configured to deflect radially outward by riding over the ramp.

In additional embodiments, the antenna module includes a housing base. A seal is configured to be compressed between the housing base and the product through operation of the fastener.

In additional embodiments, the retainer clip comprises of a conductive material to ground the antenna system to the product.

In additional embodiments, the antenna module includes an antenna farm with plural antennas coupled with the ground plane.

In additional embodiments, the antenna module contained in a structure.

In additional embodiments, a crush tube extends into the antenna module. The fastener extends through the crush tube and is configured to cause the crush tube to deform.

In additional embodiments, the ground plane is grounded to the product through the nut, the fastener, and the retainer clip.

In a number of other embodiments, an antenna mount system for a vehicle, the antenna mount system includes a vehicle accessory on the vehicle. An antenna module with a ground plane is contained in the vehicle accessory. A fastener extends into the antenna module and through the ground plane. A retainer clip is configured to move from an undeployed state to a deployed state by operation of the fastener. The fastener extends through a deployment ramp block that is configured to engage and guide the retainer clip from the undeployed state to the deployed state. The antenna mount system is configured to ground the ground plane to the vehicle and to retain the antenna module in position on the vehicle

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, antenna mount systems are described for various types of product applications. In embodiments, a self-contained and self-sealing construction is provided in a modular format. A captured fastener and grounding mechanism may clamp and seal the module to the product in an efficient manner with no loose pieces. For example, in one non-limiting application, the antenna mount system may be used to mount an antenna module to a vehicle through two simple steps of positioning the module and tightening the fastener. An effective grounding mechanism, for example a galvanic ground, is achieved including for antennas in a conformal application such as may be integrated into plastic structures such as spoilers, mirrors, shark fins, racks, or other accessories/structures. As such, the mounting system is amenable to hidden antennas contained within structures that have other functions.

In an example, an antenna mount system for a product includes an antenna module with a ground that is galvanically connected or coupled with the product. The antenna module may be contained in a structure such as a vehicle accessory like a spoiler or other structure. A fastener, such as a bolt, may extend into the antenna module and through the ground. A retainer clip may be configured to move from an undeployed position to a deployed position by operation of the fastener. In the undeployed position, the fastener and retainer clip are readily inserted through an aperture in the vehicle. The fastener may extend through the deployment ramp, which may be configured to engage and guide the retainer clip from the base position to the deployed position. When deployed, the antenna mount system grounds the ground to the product and retains the antenna module in position on the product. A number of antennas may be included in the module and coupled with the ground in an antenna farm arrangement. The fastener may extend through a crush tube, that may be conductive. The crush tube may be hollow and may make conductive contact with the ground, the fastener and/or a nut. The fastener may thread into the nut, which is located on the ground, and which may also be conductive. The crush tube that may conductively engage the ground and/or the nut to ensure conductivity between the ground plane and the fastener. Prior to deployment, the fastener may be positioned through an opening in the product. The retaining clip engages the fastener and includes a leg or legs that is/are forced against the product to provide effective grounding conductivity. A seal may be provided between the module and the product for a weathertight connection.

Figure 1:
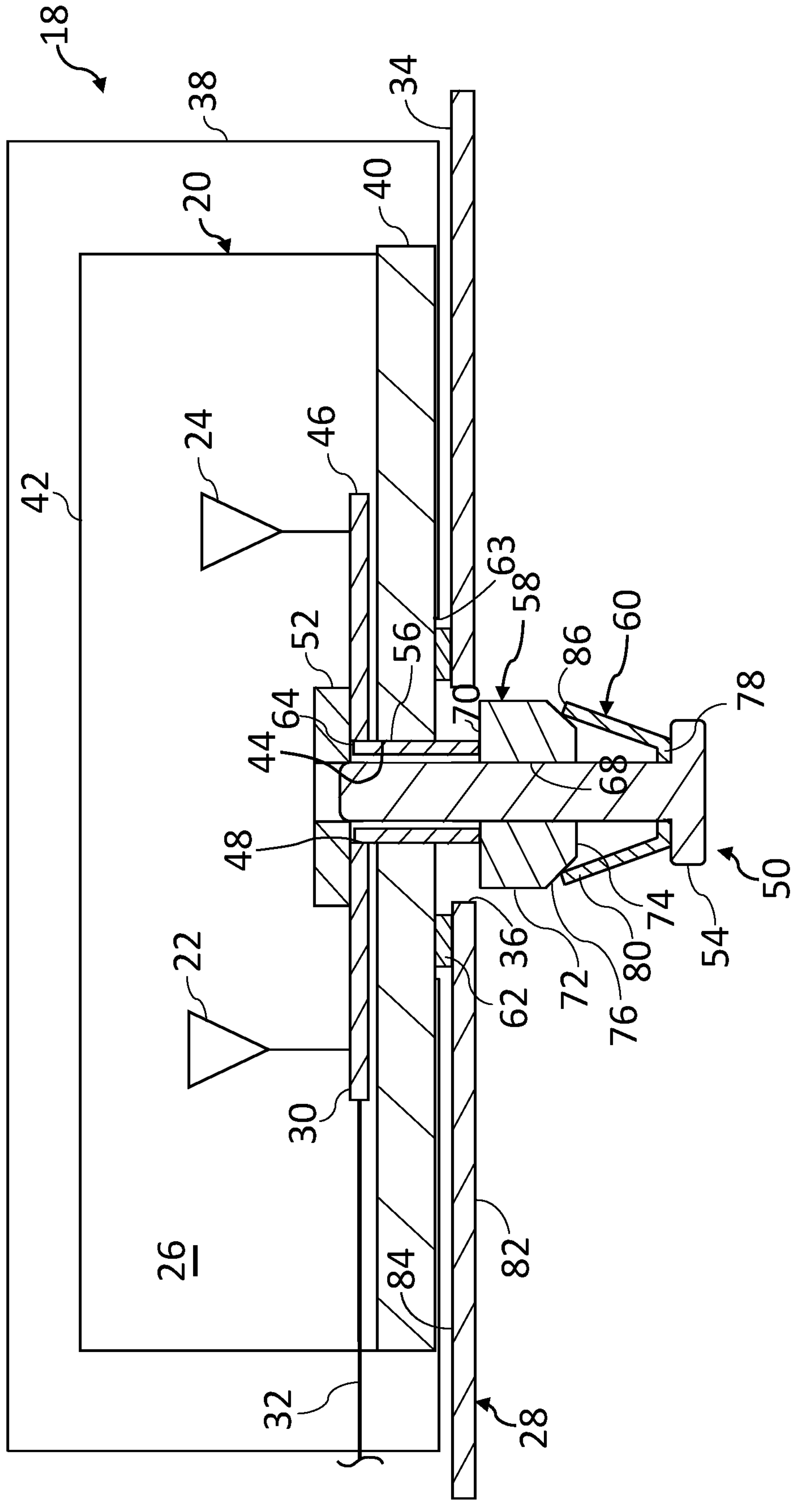
FIG. 1 is a schematic, sectional illustration of an antenna mount system in an undeployed state, in accordance with various embodiments.

Referring to FIG. 1, an antenna system 18 includes a module 20 that contains a number of antennas 22, 24 in an antenna farm arrangement. An antenna farm arrangement refers to an area 26 within the module 20 that is configured to contain a plural number of transmitting and/or receiving antennas, such as the antennas 22, 24. In other embodiments, any number of antennas may be included. The antennas 22, 24 may be any type of antenna for which grounding to a product 28 is desirable. The antennas 22, 24 may be configured for radio frequency or other applications. The antennas 22, 24 may be of the monopole, patch, slot, foil, fractal, or another type. The antennas 22, 24 are coupled with a ground, such as a ground plane 30. The ground plane 30 may be a conductive layer printed or otherwise applied to a substrate. In this embodiment a relatively large ground plane 30 is employed that is preferably galvanically grounded to the product 28. In the current embodiment the product 28 is a vehicle, such as an automobile, and includes a sheet metal panel 34 with an aperture 36. The sheet metal panel 34 may be any part of the product 28 and in the current embodiment is a vehicle trunk lid. The module 20 is contained in a structure 38 that is attached to the product 28. In the current embodiment, the structure 38 is a spoiler included for harnessing air induced forces and/or for aesthetic purposes. In other embodiments, the structure 38 may be an accessory that is included on the product 28 for other purposes, such as for housing antennas and/or for other functions.

The module 20 defines the area 26 through inclusion of a housing base 40 and a housing cover 42, both made of a nonconductive material such as plastic. The housing cover 42 is a closed unit defining five sides of the area 26. The housing base 40 defines a sixth side of the area 26 and includes an opening 44, which is a round hole generally centered in the housing base 40 providing access to the area 26.

The ground plane 30 is conductive and is defined on a substrate such as a printed circuit board 46. The printed circuit board 46 may be a standard printed circuit board or a radio frequency printed circuit board for higher frequency applications. The printed circuit board 46 may contain additional electronic elements of the antenna system (not shown) and is coupled with the antenna cable 32 for connection with the system(s) (not shown) using the antennas. The printed circuit board 46 has a hole 48 with a center that is axially aligned with the opening 44 in the housing base 40. The hole 48 and the opening 44 have diameters that are of a common size. The hole 48 and the opening 44 each have centers that are axially aligned with the aperture 36 in the sheet metal panel 34 when the module 20 is positioned on the product 28. The aperture 36 has a diameter that is larger than the diameters of the hole 48 and the opening 44.

The antenna system 18 includes a grounding and retaining system 50. The grounding and retaining system 50 generally includes a nut 52, a fastener 54, a crush tube 56, a deployment ramp block 58, a retainer clip 60 and a seal 62. The nut 52 is made of a conductive material such as metal and sits on or against the ground plane 30 with a galvanic connection therebetween. The nut 52 includes an initially unthreaded inner diameter 55 and may be fixed to the ground plane 30 such as by a mechanical coupling, a physical connection, or chemical bond, or may be retained in place by the fastener 54 alone. The fastener 54 is embodied as a bolt that is made of a material such as steel with a conductive electroplated outer surface of a metal such as copper, or another material. The fastener 54 may be a self-threading bolt configured to form mating threads at the inner diameter 55 of the nut 52 when rotated therein. The crush tube 56 is made of a conductive material such as copper. The crush tube 56 is formed as a hollow cylinder and extends through the aperture 36, the opening 44, and the hole 48, with an end 64 configured to engage the nut 52. The fastener 54 extends through the crush tube 56 and engages the nut 52.

Initially in the undeployed state of FIG. 1, the fastener 54 may be retained in the nut 52 by being partially threaded therein. In other embodiments, the fastener 54 may be configured in a different form such as a pin that is retained by a press fit into the nut 52, or by another means. The deployment ramp block 58 may be made of a nonconductive material such as plastic. The deployment ramp block 58 includes a central bore 68 through which the shaft of the fastener 54 extends, an annular base 70 engaging the crush tube 56, an outer perimeter 72, an annular cap 74 and an annular ramp 76 facing away from the module 20. The retainer clip 60 is annular in shape with an annular crown 78 positioned against the head of the fastener 54 and configured to mate with the annular cap 74 of the deployment ramp block 58. The fastener 54 extends through a hole in the annular crown 78. An annular leg 80 extends from the annular crown 78 toward the deployment ramp block 58 and engages the annular ramp 76. The retainer clip 60 may be made of a conductive and flexible material such as high carbon steel. The seal 62 is of an annular in shape and made the of a resilient material such as natural or synthetic rubber. The seal 62 is configured to be compressed between housing base 40 and the panel 34 to provide a weathertight assembly suitable for a vehicle exterior. The structure 38 includes an opening 63 that is large enough for the seal 62 to extend through for contact with the panel 34.

Figure 2:
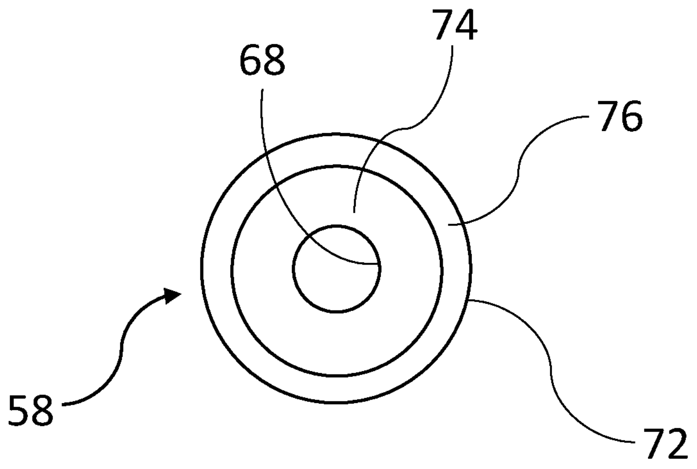
FIG. 2 is a ramp side view of a deployment ramp block of the antenna mount system of FIG. 1.

The deployment ramp block 58 is illustrated in FIG. 2 as viewed from its annular cap 74 side. It can be seen that the outer perimeter 72 defines a round, generally cylindrical shape for the deployment ramp block 58. As a result, the annular ramp 76 has an annular and semi-conical shape for guiding the annular leg 80 of the retainer clip 60. The annular ramp diverges outward from its start at the cap 74 to its end at the outer perimeter 72.

In FIG. 1, the antenna system 18 is illustrated in position corresponding to an undeployed state of the grounding and retaining system 50, with the retainer clip 60 disposed to fit through the aperture 36. In addition, the outer perimeter 72 of the deployment ramp block 58 is sized to fit through the aperture 36. The module 20 is assembled to include the grounding and retaining system 50 as a package, and then positioned with the seal 62 on the product 28. When positioned, the grounding and retaining system 50, the fastener, 54, the retainer clip 60 and the deployment ramp block are inserted through the aperture 36 to the inside 82 of the panel 34. The shaft of the fastener 54 and the crush tube 56 extend through the aperture 36 extending both on the outside 84 and the inside 82 of the panel 34.

Figure 3:
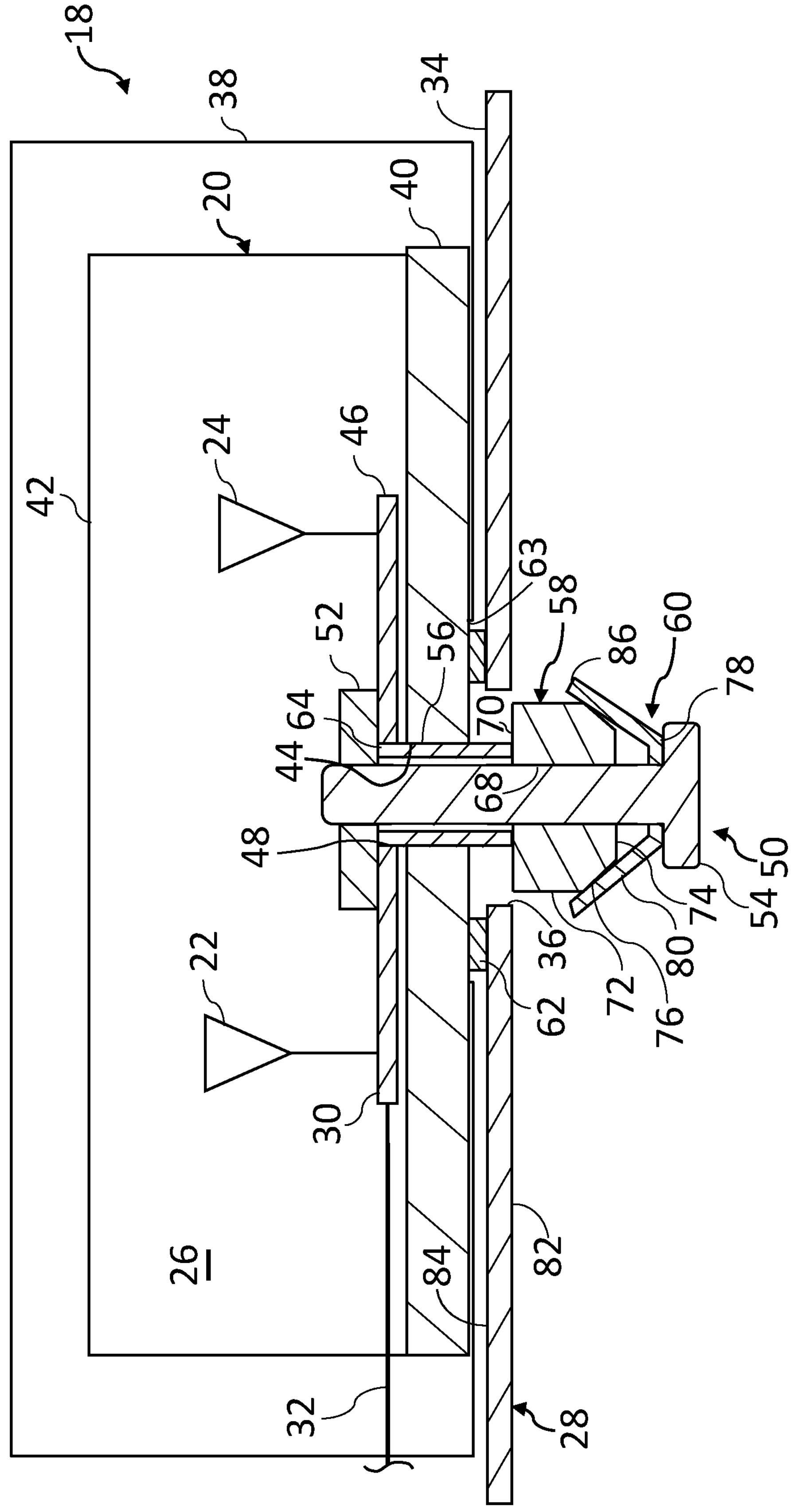
FIG. 3 is a schematic, sectional illustration of an antenna mount system of FIG. 1 in a state of being deployed, in accordance with various embodiments.

Referring to FIG. 3, the grounding and retaining system 50 is shown in position corresponding to a state of being deployed, with the retainer clip 60 moving toward a position to retain the module 20 on the product 28 and the ground plane 30 grounded to the panel 34. When the fastener 54 is tightened, self-threading into the nut 52, the end 86 of the annular leg 80 rides along the annular ramp 76 of the deployment ramp block 58 and is forced radially outward. The end 86 of the annular leg 80 then moves outward away from the annular ramp 76 expanding to a size larger than the diameter of the aperture 36 and of the outer perimeter 72. The moving parts during deployment primarily include the fastener 54 and the retainer clip 60. The deployment ramp block 58 may also move, particularly when deployment is nearing completion when the crush tube 56 is deforming.

Figure 4:
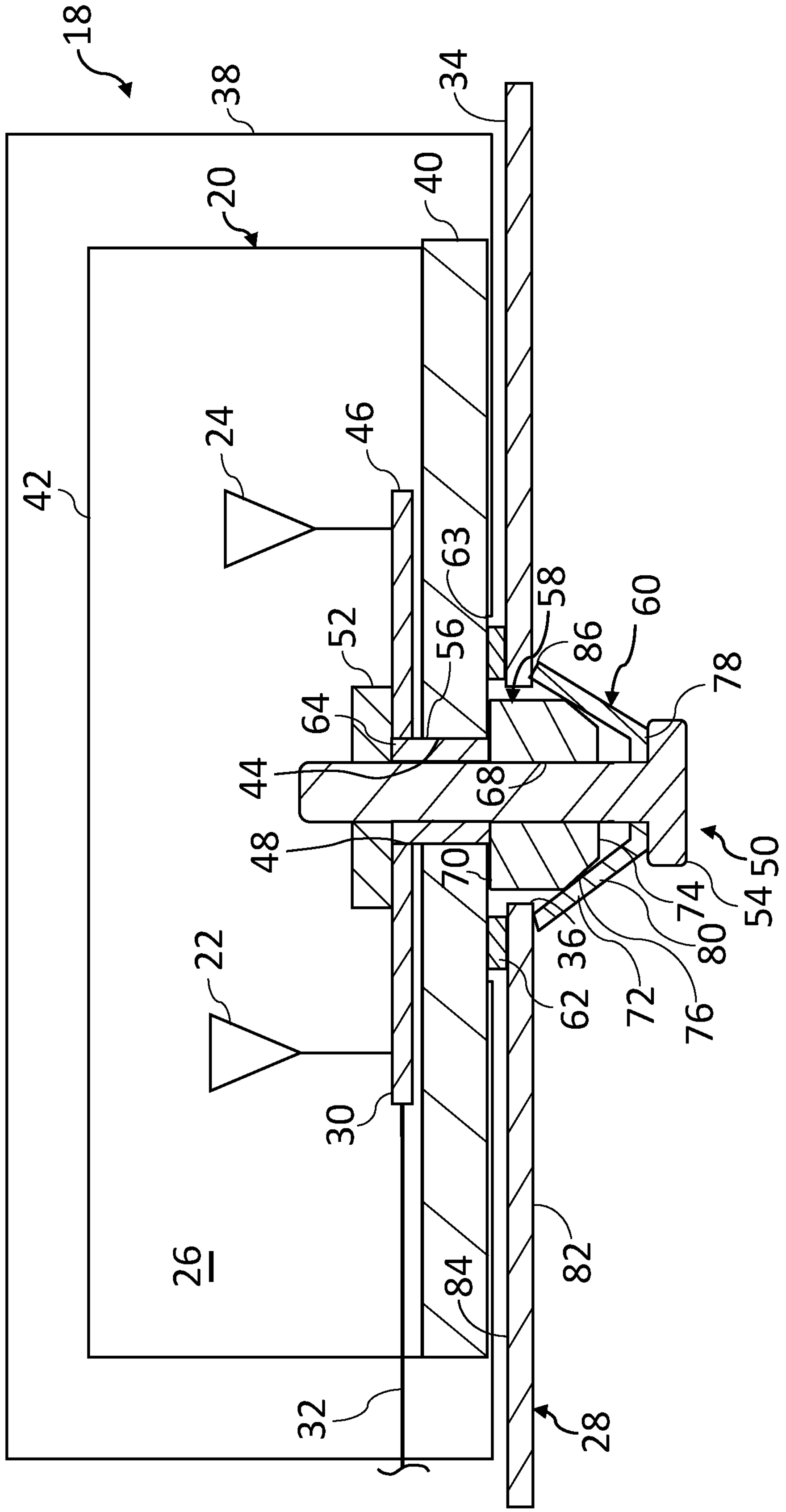
FIG. 4 is schematic, sectional illustration of the antenna mount system of FIG. 1 in a deployed state, in accordance with various embodiments.

As the fastener 54 is further tightened, the antenna system 18 is moved to a position corresponding to a deployed state of the grounding and retaining system 50, as shown in FIG. 4. The end 86 of the annular leg 80 has scraped along and is compressed against the panel 34 providing effective grounding thereto. The crush tube 56 is compressed between the deployment ramp block 58 and the nut 52 and may be in a deformed state and engages the nut 52 and the fastener 54. The nut 52 is forced against the ground plane 30 and the seal 62 is compressed between the housing base 40 and the panel 34. Grounding to the panel 34 is provided from the ground plane 30, through the nut 52, the fastener 54 and the retainer clip 60. An additional path may be effected through the crush tube 56 by contact with the nut 52 and the fastener 54.

Accordingly, an effective grounding mechanism is provided for antennas, such as those mounted on vehicles. A self-contained and self-sealing construction is provided in a modular format, where a captured fastener and grounding mechanism clamps, grounds, and seals an antenna module to the vehicle in an efficient manner with no loose pieces.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A mount system for a product, the mount system comprising:
- a panel defining an aperture;
- a module with a ground;
- a fastener extending into the module;
- a retainer clip configured to move from an undeployed position to a deployed position by operation of the fastener, the retainer clip having a leg with a terminal end; and
- a deployment ramp block through which the fastener extends, the deployment ramp block configured to engage and, through operation of the fastener, guide the retainer clip from the undeployed position to the deployed position,
- wherein, when in the undeployed position, the retainer clip is disposed with the terminal end of the leg against the deployment ramp block and is disposed to fit through the aperture,
- wherein the mount system is configured to effect grounding of the ground to the panel and to retain, when in the deployed position, the module in a fixed position on the panel.

2. The mount system of claim 1, wherein the module includes at least one antenna, and wherein the ground comprises a ground plane coupled with the at least one antenna.

3. The mount system of claim 1, wherein the retainer clip includes a crown through which the fastener extends, wherein the deployment ramp block includes a ramp, wherein the leg extends from the crown to the ramp of the deployment ramp block, wherein the terminal end of the leg is configured to move along the ramp when the retainer clip moves from the undeployed position to the deployed position.

4. The mount system of claim 1, wherein the deployment ramp block includes a ramp that is annular in shape, wherein the leg of the retainer clip is configured to deflect radially outward by riding over the ramp.

5. The mount system of claim 1, wherein the module includes a housing base, and comprising a seal configured to be compressed between the housing base and the panel through operation of the fastener.

6. The mount system of claim 1, wherein the module comprises an antenna farm with plural antennas coupled with the ground.

7. The mount system of claim 1, comprising a structure, with the module contained in the structure.

8. The mount system of claim 1, comprising a crush tube extending into the module, wherein the fastener extends through the crush tube and is configured to cause the crush tube to deform when the retainer clip moves from the undeployed position to the deployed position, with the crush tube providing a ground path between the ground and the panel.

9. The mount system of claim 1, comprising a structure that contains the module, wherein the structure comprises a vehicle accessory.

10. The mount system of claim 1, comprising a circuit board in the module, wherein the ground comprises a ground plane on the circuit board.

11. An antenna mount system for a product, the antenna mount system comprising:

an antenna module with a ground plane;

a fastener extending into the antenna module and through the ground plane;

a retainer clip configured to move from an undeployed state to a deployed state by operation of the fastener; and a deployment ramp block through which the fastener extends, the deployment ramp block configured to engage and guide the retainer clip from the undeployed state to the deployed state, wherein the antenna mount system is configured to ground the ground plane to the product, with the fastener grounded to the ground plane and the product grounded to the fastener through the retainer clip, and the antenna mount system is configured to retain the antenna module in position on the product.

12. The antenna mount system of claim 11, wherein the retainer clip includes a crown that is annular in shape and through which the fastener extends, and the retainer clip includes a leg extending from the crown to the deployment ramp block, wherein the leg is annular in shape.

13. The antenna mount system of claim 11, comprising a panel that defines an aperture, wherein the retainer clip has a leg that extends to a terminal end, wherein, when in the undeployed state, the retainer clip is disposed with the terminal end of the leg against the deployment ramp block and is disposed to fit through the aperture, wherein the deployment ramp block includes a ramp that is annular in shape, wherein the leg of the retainer clip is configured to deflect radially outward by riding over the ramp, wherein the terminal end of the leg is configured to move along the ramp when the retainer clip moves from the undeployed state to the deployed state.

14. The antenna mount system of claim 11, wherein the antenna module includes a housing base, and comprising a seal configured to be compressed between the housing base and the product through operation of the fastener.

15. The antenna mount system of claim 11, wherein the retainer clip comprises a conductive material that grounds the antenna mount system to the product.

16. The antenna mount system of claim 11, wherein the antenna module comprises an antenna farm with plural antennas coupled with the ground plane.

17. The antenna mount system of claim 11, comprising a structure, with the antenna module contained in the structure.

18. The antenna mount system of claim 11, comprising a crush tube extending into the antenna module, wherein the fastener extends through the crush tube and is configured to cause the crush tube to deform.

19. The antenna mount system of claim 11, wherein the product includes a panel, wherein the ground plane is grounded to the product panel through a nut, the fastener, and the retainer clip.

20. An antenna mount system for a vehicle, the antenna mount system comprising:

a vehicle accessory on the vehicle, the vehicle accessory defining an aperture;

an antenna module with a ground plane, the antenna module connected with the vehicle accessory;

a fastener extending into the antenna module and through the ground plane;

a retainer clip, the retainer clip having a leg that extends to a terminal end, the retainer clip configured to move from an undeployed state to a deployed state by operation of the fastener; and a deployment ramp block through which the fastener extends, the deployment ramp block including a ramp that is configured to engage and guide the retainer clip from the undeployed state to the deployed state, wherein, when in the undeployed state, the retainer clip is disposed with the terminal end of the leg against the ramp and is disposed to fit through the aperture, wherein the terminal end of the leg is configured to move along the ramp when the retainer clip moves from the undeployed state to the deployed state, wherein the antenna mount system is configured to ground the ground plane to the vehicle and to retain, when in the deployed state, the antenna module in a fixed position on the vehicle.

* * * * *